(12) United States Patent
Atungsiri et al.

(10) Patent No.: US 12,101,820 B2
(45) Date of Patent: Sep. 24, 2024

(54) COMMUNICATIONS DEVICE, INFRASTRUCTURE EQUIPMENT AND METHODS

(71) Applicant: Sony Group Corporation, Tokyo (JP)

(72) Inventors: Samuel Asangbeng Atungsiri, Basingstoke (GB); Martin Warwick Beale, Basingstoke (GB); Yassin Aden Awad, Basingstoke (GB); Yuxin Wei, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 318 days.

(21) Appl. No.: 17/428,641

(22) PCT Filed: Jan. 10, 2020

(86) PCT No.: PCT/EP2020/050581
§ 371 (c)(1),
(2) Date: Aug. 5, 2021

(87) PCT Pub. No.: WO2020/164825
PCT Pub. Date: Aug. 20, 2020

(65) Prior Publication Data
US 2022/0022259 A1 Jan. 20, 2022

(30) Foreign Application Priority Data
Feb. 15, 2019 (EP) ..................................... 19157594

(51) Int. Cl.
*H04W 4/00* (2018.01)
*H04L 1/08* (2006.01)
(Continued)

(52) U.S. Cl.
CPC ............ *H04W 74/0833* (2013.01); *H04L 1/08* (2013.01); *H04W 72/1268* (2013.01); *H04W 72/23* (2023.01)

(58) Field of Classification Search
None
See application file for complete search history.

(56) References Cited

U.S. PATENT DOCUMENTS 9,832,794 B2   11/2017   Martin
2015/0023281 A1   1/2015   Wu
(Continued)

FOREIGN PATENT DOCUMENTS

CN   105557056 A   5/2016
CN   108282897 A   7/2018
(Continued)

OTHER PUBLICATIONS

International Search Report and Written Opinion mailed on Jan. 10, 2020, received for PCT Application PCT/EP2020/050581, Filed on Mar. 17, 2020, 11 pages.
(Continued)

*Primary Examiner* — Zewdu A Beyen
(74) *Attorney, Agent, or Firm* — XSENSUS LLP

(57) ABSTRACT

A communications device for transmitting data to a wireless communications network is configured to transmit a random access preamble, and to transmit uplink data in an uplink shared physical channel associated with the preamble according to a 2-step random access procedure, the association between the preamble and the uplink shared channel being known to the wireless communications network. The communications device is configured to detect, in response to transmitting the preamble and the uplink data, a random access response message providing timing advance information and uplink grant of resources of the uplink shared
(Continued)

channel according to a 4-step random access procedure. In response to detecting the random access response message, the communications device is configured to transmit uplink data in the uplink resources granted in the random access response message according to a 4-step random access procedure, as if the communications device was continuing with a 4-step RACH procedure having started with a 2-step RACH procedure. As such there is no requirement to fallback to a full 4-step random access procedure, if a 2-step random access procedure has failed, thereby saving time and communications resources.

20 Claims, 8 Drawing Sheets

(51) Int. Cl.
  *H04W 72/1268* (2023.01)
  *H04W 72/23* (2023.01)
  *H04W 74/0833* (2024.01)

(56) References Cited

U.S. PATENT DOCUMENTS

| | | |
|---|---|---|
| 2017/0019930 A1 | 1/2017 | Lee |
| 2018/0084578 A1 | 3/2018 | Kato et al. |
| 2020/0252974 A1* | 8/2020 | Akkarakaran ........ H04W 52/36 |

FOREIGN PATENT DOCUMENTS

| | | |
|---|---|---|
| WO | 2018/127549 A1 | 7/2018 |
| WO | WO-2018151230 A1 | 8/2018 |
| WO | WO-2018175809 A1 | 9/2018 |

OTHER PUBLICATIONS

Qualcomm Inc., "New WID on NR-based Access to Unlicensed Spectrum", 3GPP TSG RAN Meeting #82, RP-182878, Dec. 10-13, 2018, 7 pages.
3GPP, "Evolved Universal Terrestrial Radio Access (E-UTRA); Physical layer procedures (Release 13)", 3GPP TS 36.213 V13.0.0, Dec. 2015, 218 pages.
ZTE Corporation, "New work item: 2-step RACH for NR", 3GPP TSG RAN Meeting #82, RP-182894, Dec. 10-13, 2018, 5 pages.
Interdigital, "2-Step RACH Procedure", 3GPP TSG-RAN WG2 Meeting # 103bis, R2-1814008,, Oct. 8-12, 2018, pp. 1-5.
Vivo, "RAN2 impacts of 2-step RACH", 3GPP TSG-RAN WG2 Meeting #104, R2-1818260, Nov. 12-16, 2018, 5 pages.
Holma et al., "LTE for UMTS OFDMA and SC-FDMA Based Radio Access", John Wiley & Sons, 2009, pp. 25-27.
Huawei et al., "UL data transmission in RRC_Inactive", 3GPP TSG-RAN WG2 #96, R2-168544, Nov. 14-18, 2016, pp. 1-8.
Ericsson, "Baseline solution for small data transmission in RRC_Inactive", 3GPP TSG-RAN WG2 #96, R2-168713, Nov. 14-18, 2016, 7 pages.
Huawei et al., "Revised work item proposal: Enhancements of NB-IoT", 3GPP TSG RAN Meeting #73, RP-161901, Sep. 19-22, 2016, 8 pages.
Ericsson, "Revised WID for Further Enhanced MTC for LTE", 3GPP TSG RAN Meeting #73, RP-161464, Sep. 19-22, 2016, 6 pages.
Ericsson et al., "New WID on Even further enhanced MTC for LTE", 3GPP TSG RAN Meeting #75, RP-170732, Mar. 6-9, 2017, 4 pages.
Huawei et al., "New WID on Further NB-IoT enhancements", #3GPP TSG RAN Meeting #75, RP-170852, Mar. 6-9, 2017, 6 pages.
NTT Docomo, Inc, "Revised WID on New Radio Access Technology", 3GPP TSG RAN Meeting #78, RP-172834, Dec. 18-21, 2017, 11 pages.
Nokia et al., "Revised SID: Study on NR Industrial Internet of Things (IoT)", 3GPP TSG RAN meeting #81, RP-182090, Sep. 10-13, 2018, 5 pages.
3GPP, "NR; NR and NG-RAN Overall Description; Stage 2 (Release 15)", 3GPP TS 38.300 V15.4.0, Dec. 2018, pp. 1-97.
3GPPtsg_ran wg1_rl1 Aug. 17, 2018 "R1-1809480 7.2.2.4.2 Initial access and mobility procedures for NR-U".

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2020/050581, filed Jan. 10, 2020, which claims the priority of European patent application no. EP 19157594.3, filed Feb. 15, 2019, the contents of each are hereby incorporated by reference.

BACKGROUND

Field of Disclosure

The present disclosure relates to random access (RACH) procedures of communications devices which are configured to transmit data to and receive data from infrastructure equipment of a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things" or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of network infrastructure equipment and terminal devices associated with different traffic profiles gives rise to new challenges for efficiently handling communications in wireless communications systems that need to be addressed. In particular more efficient transmission of uplink data using random access procedures can present technical challenges.

SUMMARY OF THE DISCLOSURE

The present disclosure can help address or mitigate at least some of the issues discussed above.

Accordingly various aspects and features of the present technique are defined in the appended claims.

As such, according to one aspect, embodiments of the present technique can provide a communications device for transmitting data to a wireless communications network, in which the communications device is configured to transmit a random access preamble, and to transmit first uplink data in an uplink shared physical channel associated with the preamble according to a 2-step random access procedure, the association between the preamble and the first uplink shared channel being known to the wireless communications network. The communications device is configured to detect, in response to transmitting the preamble and the first uplink data, a random access response message providing timing advance information and uplink grant of resources of the uplink shared channel according to a 4-step random access procedure, and in response to detecting the random access response message, to transmit second uplink data in the uplink resources granted in the random access response message according to a 4-step random access procedure, as if the communications device was continuing with a 4-step RACH procedure having started with a 2-step RACH procedure. The second uplink data may be any one of the first uplink data, part of the first uplink data, a scheduling request message to transmit uplink data or a combination thereof.

On the network side, according to another aspect an example embodiment can provide for radio network element to be configured according to an example embodiment to detect a random access preamble transmitted by a communications device in a random access channel of the wireless access interface, to determine that if the random access preamble was transmitted according to a 2-step random access procedure, that the 2-step random access procedure has failed, to determine a timing advance which should be used by the communications device to transmit signals to the network element from a time of detecting the random access preamble with respect to a time of the random access channel of the wireless access interface and to determine resources of the uplink shared channel granted to the communications device, and to transmit a random access response message providing timing advance information and the uplink grant of resources according to a 4-step random access procedure.

Example embodiments can provide an improvement in a time required to recover from a failure of a 2-step random access procedure, by not falling-back to perform a 4-step random access procedure, but arranging for a radio network element which detects a preamble to transmit a random access response message (message 2) of the 4-step random access process, so that the communications device can continue as if it had started a 4-step random access procedure by transmitting a message 3.

Respective aspects and features of the present disclosure are defined in the appended claims. It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
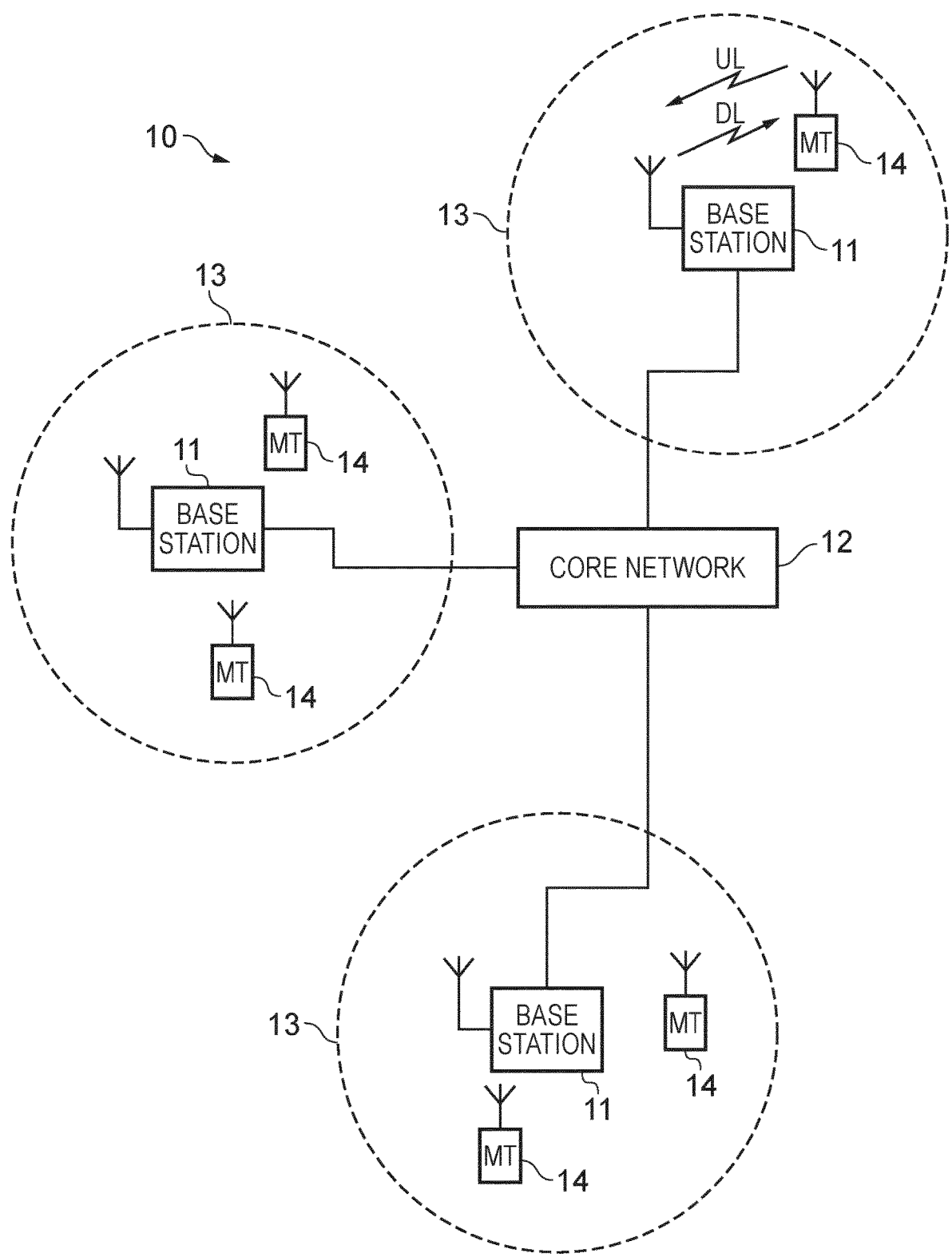
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [5]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (eMBB)
Massive Machine Type Communications (mMTC)

Ultra Reliable & Low Latency Communications (URLLC) [6]

eMBB services are characterised by high capacity with a requirement to support up to 20 Gb/s. The requirement for URLLC is a reliability of $1-10^{-5}$ (99.999%) for one transmission of a relatively short packet such as 32 bytes with a user plane latency of 1 ms.

The elements of the wireless access network shown in FIG. 1 may be equally applied to a 5G new RAT configuration, except that a change in terminology may be applied as mentioned above.

Figure 2:
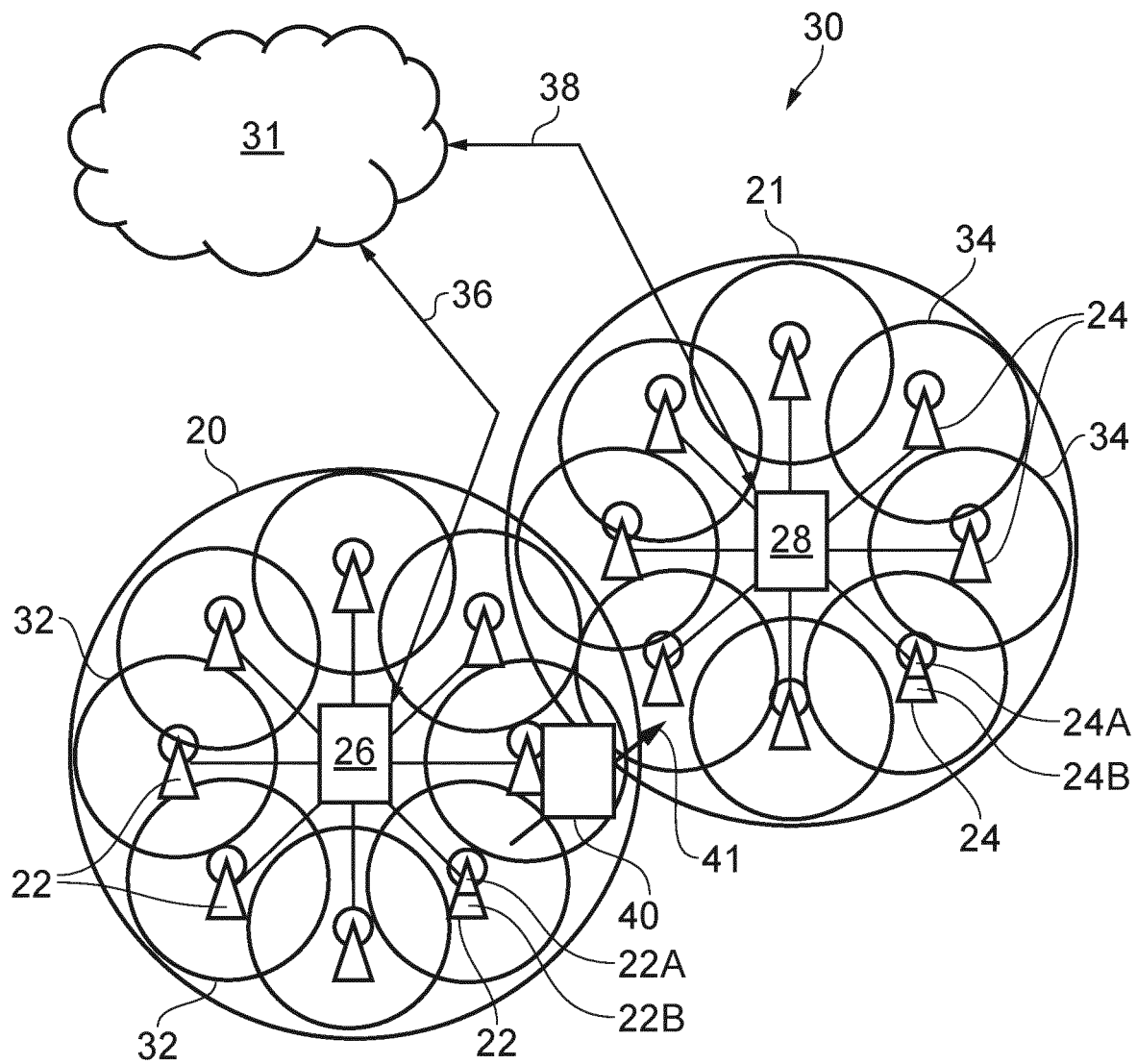
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, gNodeB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Current RACH Procedures in LTE

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

In addition to a terminal device deciding itself to initiate a random access procedure to connect to the network, it is also possible for the network, e.g. a base station, to instruct a terminal device in connected mode to initiate a random access procedure by transmitting to the terminal device an instruction to do so. Such an instruction is sometimes referred to as a PDCCH order (Physical Downlink Control Channel order), see, for example, Section 5.3.3.1.3 in ETSI TS 136 213 V13.0.0 (2016 January)/3GPP TS 36.212 version 13.0.0 Release 13 [7].

There are various scenarios in which a network triggered RACH procedure (PDCCH order) may arise. For example:
  a terminal device may receive a PDCCH order to transmit on PRACH as part of a handover procedure;
  a terminal device that is RRC connected to a base station but has not exchanged data with the base station for a relatively long time may receive a PDCCH order to cause the terminal device to transmit a PRACH preamble so that it can be re-synchronised to the network and allow the base station to correct timings for the terminal device;
  a terminal device may receive a PDCCH order so that it can establish a different RRC configuration in the subsequent RACH procedure, this may apply, for example, for a narrowband IoT terminal device which is prevented from RRC reconfiguration in connected mode whereby sending the terminal device to idle mode through a PDCCH order allows the terminal device to be configured in the subsequent PRACH procedure, for example to configure the terminal device for a different coverage enhancement level (e.g. more or fewer repetitions).

Figure 3:
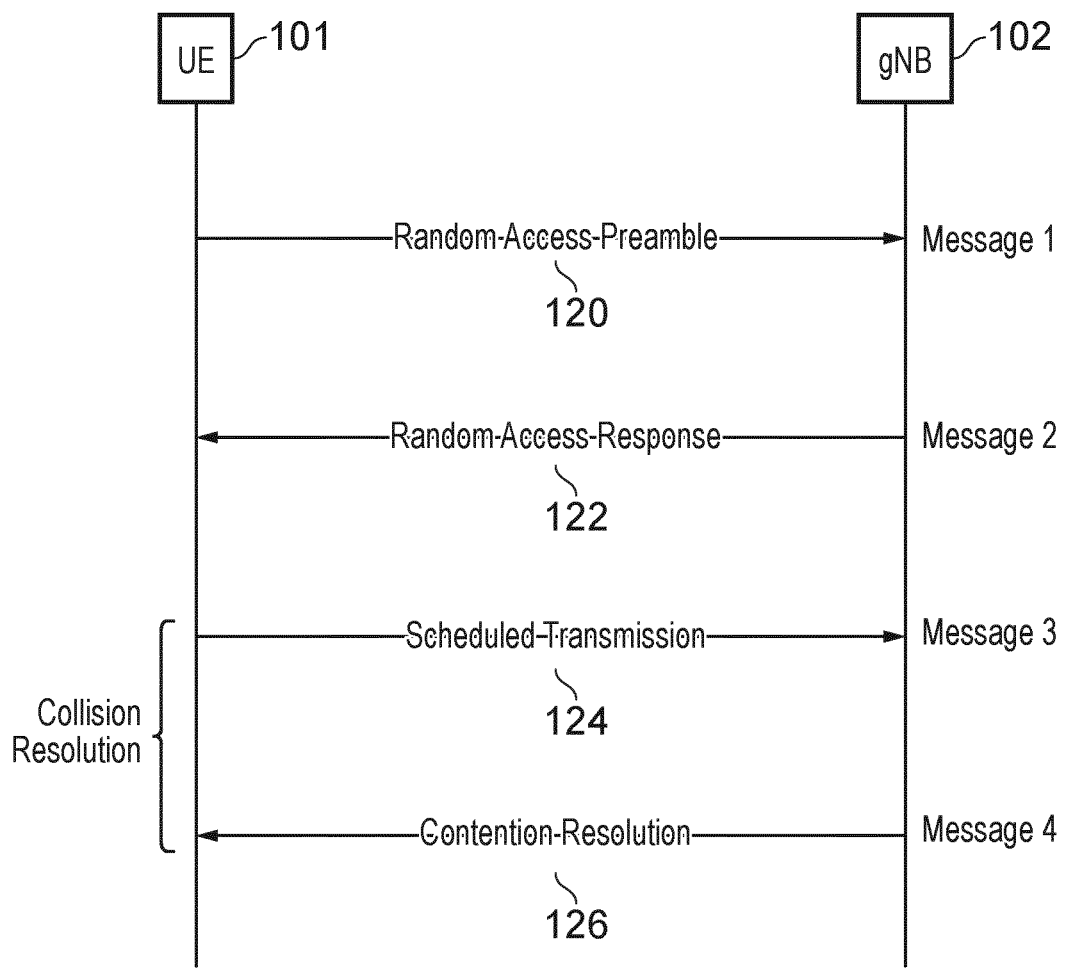
FIG. 3 is a schematic representation illustrating steps in a four-step random access procedure in a wireless telecommunications network.

FIG. 3 shows a typical RACH procedure used in LTE systems such as that described by reference to FIG. 1 which could also be applied to an NR wireless communications system such as that described by reference to FIG. 2. A UE 101, which could be in an inactive or idle mode, may have some data which it needs to send to the network. To do so, the UE sends a random access preamble 120 (message 1) to a gNodeB 102. This random access preamble 120 indicates the identity of the UE 101 to the gNodeB 102, such that the gNodeB 102 can address the UE 101 during later stages of the RACH procedure. Assuming the random access preamble 120 is successfully received by the gNodeB 102 (and if not, the UE 101 will simply re-transmit it with a higher power), the gNodeB 102 will transmit a random access response 122 message (message 2) to the UE 101 based on the identity indicated in the received random access preamble 120. The random access response 122 message carries a further identity which is assigned by the gNodeB 102 to identify the UE 101, as well as a timing advance value (such that the UE 101 can change its timing to compensate for the round trip delay caused by its distance from the gNodeB 102) and grant uplink resources for the UE 101 to transmit the data in. Following the reception of the random access response message 122, the UE 101 transmits the scheduled transmission of data 124 to the gNodeB 102 (message 3), using the identity assigned to it in the random access response message 122. Assuming there are no collisions with other UEs, which may occur if another UE and the UE 101 send the same random access preamble 120 to the gNodeB 102 at the same time and using the same frequency resources, the scheduled transmission of data 124 is successfully received by the gNodeB 102. The gNodeB 102 will respond to the scheduled transmission 124 with a contention resolution message 126 (message 4).

Those familiar with the development of 5G/NR will appreciate that technical challenges concern mapping conventional UE states (e.g. RRC_IDLE, RRC_CONNECTED etc.) to 5G/NR systems. A new "inactive" state may be used, where a UE is able to start data transfer with a low delay in the inactive state without transition to a connected state. Some possible solutions include:
  Data could be transmitted together with an initial radio resource control (RRC) message requesting a transition to the connected state, or
  Data could be transmitted in a new state.

Figure 4:
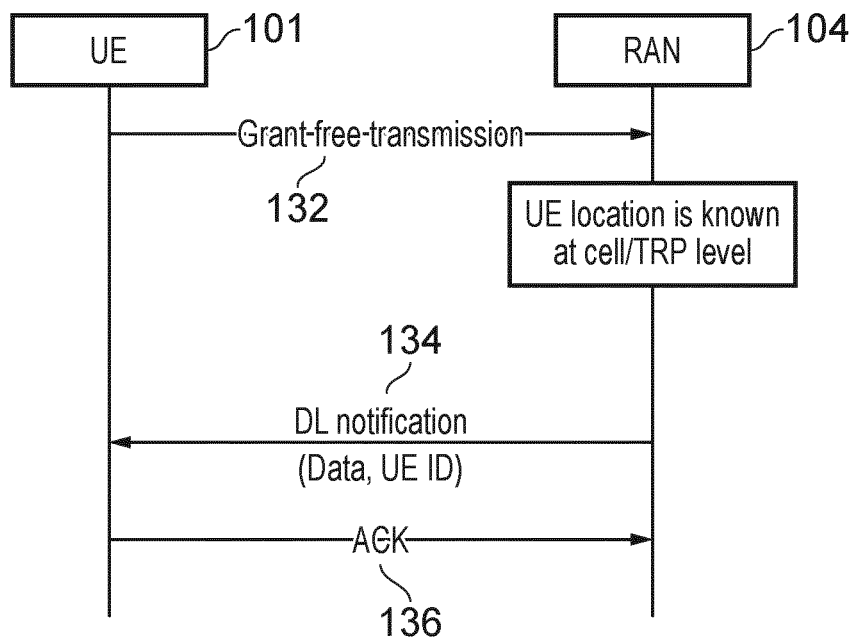
FIG. 4 is a schematic representation illustrating an example of uplink data transmission of a communications device in RRC_INACTIVE mode with a downlink response from the network.

Some proposals also include sending uplink data without RRC signalling in the inactive state and without the UE initiating a transition to the connected state. A first potential solution is discussed in 3GPP document R2-168544 titled "UL data transmission in RRC_INACTIVE" (Huawei) [8]. This solution is shown in FIG. 4, which is reproduced along with the accompanying text from [8]. As shown in FIG. 4, an uplink data transmission 132 can be made to a network 104 in the RRC_INACTIVE state by a UE 101. The network 104 here at least knows in which cell the transmission 132 was received, and potentially may even know via which TRP. For a certain amount of time after receiving an uplink data packet, the network 104 could assume that the UE 101 is still in the same location, so that any RLC acknowledgement or application response could be scheduled for transmission to the UE 101 in the same area where the UE 101 is, for example in the next paging response 134. Alternatively, the UE 101 may be paged in a wider area. Following reception of this downlink response 134 the UE 101 may transmit an acknowledgement 136 to the network 104 to indicate that it was successfully received.

Figure 5:
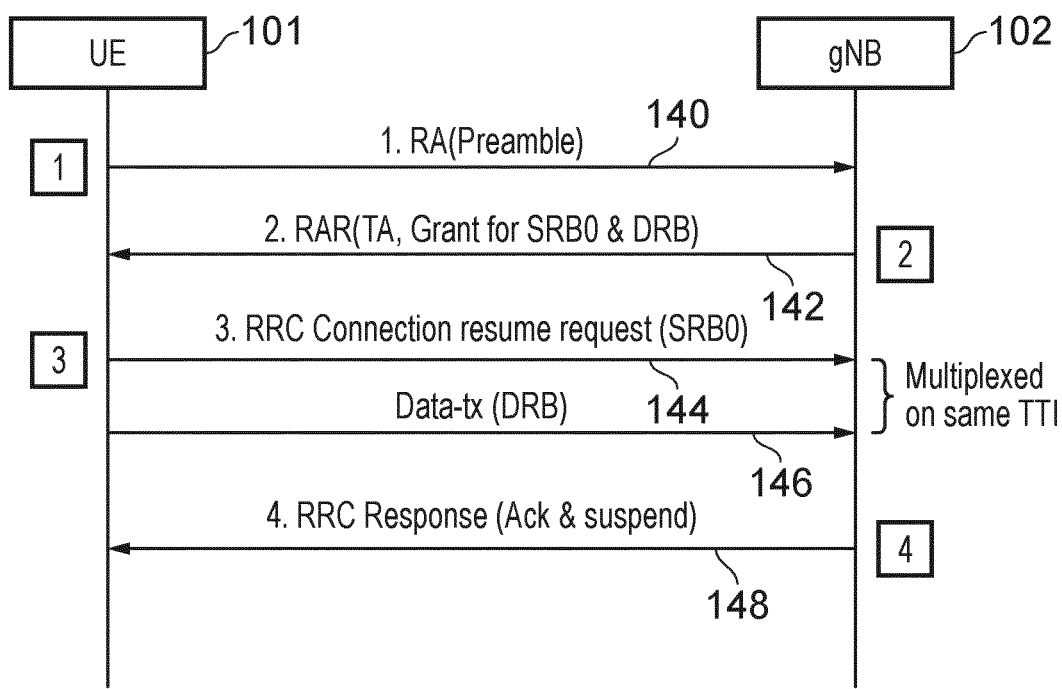
FIG. 5 is a schematic representation illustrating an example random access procedure which could be applied for transmissions of small amounts of data.

A second potential solution is discussed in 3GPP document R2-168713 titled "Baseline solution for small data transmission in RRC_INACTIVE" (Ericsson) [9]. This solution is shown in FIG. 5, which is reproduced along with the accompanying text from [9]. The mechanism described in FIG. 5 is for small data transmissions and is based on the Suspend-Resume mechanism for LTE. The main difference is that User Plane data is transmitted simultaneously with message 3 (the RRC Connection resume request 144 in FIG. 5) and an optional RRC suspend signalled in message 4. As shown in FIG. 5, initially under the assumption of a random access scheme as in LTE, when a UE 101 receives uplink data to transmit to a gNodeB 102 of a mobile communications network, the UE 101 first transmits a random access (RA) preamble 140. Here a special set of preambles (a preamble partition) can be used as in LTE to indicate a small data transmission (meaning that the UE 101 wants a larger grant and possibly that the UE 101 wishes to remain in the inactive state).

The network (via the gNodeB 102) responds with a random access response (RAR) message 142 containing timing advance and a grant. The grant for message 3 should be large enough to fit both the RRC request and a small amount of data. The allowable size of the data could be specified and linked to the preambles, e.g. preamble X asks for a grant to allow Y bytes of data. Depending on available resources, the gNodeB 102 may supply a grant for message 3 accommodating only the resume request, in which case an additional grant could be supplied after reception of message 3.

At this point the UE 101 will prepare the RRC Connection Resume Request 144 and perform the following actions:

Re-establish Packet Data Convergence Protocol (PDCP) for SRBs and all DRBs that are established;

Re-establish RLC for signalling radio bearers (SRBs) and all data radio bearers (DRBs) that are established. The PDCP should reset sequence numbers (SN) and hyper frame numbers (HFN) during this step;

Resume SRBs and all DRBs that are suspended;

Derive a new security key (e.g. eNB key, or KeNB) possible based on next-hop chaining counters (NCC) provided before the UE 101 was sent to the "inactive" state;

Generate encryption and integrity protection keys and configure PDCP layers with previously configured security algorithm;

Generate RRC Connection Resume Request message 144;

An indication, e.g. a buffer status report (BSR), of potentially remaining data is added;

An indication that the UE 101 wishes to remain in the inactive state (if this is not indicated by the preamble) is added;

Apply the default physical channel and media access control (MAC) configuration; and Submit RRC Connection Resume Request 144 and data 146 to lower layers for transmission.

After these steps, the lower layers transmit Message 3. This can also contain User Plane data 146 multiplexed by MAC, like existing LTE specifications as security context is already activated to encrypt the User Plane. The signalling (using SRB) and data (using DRB will be multiplexed by MAC layer (meaning the data is not sent on the SRB).

The network (via the gNodeB 102) receives Message 3 and uses the context identifier to retrieve the UE's 101 RRC context and re-establish the PDCP and RLC for the SRBs and DRBs. The RRC context contains the encryption key and the User Plane data is decrypted (will be mapped to the DRB that is re-established or to an always available contention based channel).

Upon successful reception of Message 3 and User Plane data, the network (via the gNodeB 102) responds with a new RRC response message 148 which could either be an "RRC suspend" or an "RRC resume" or an "RRC reject". This transmission resolves contention and acts as an acknowledgement of Message 3. In addition to RRC signalling the network can in the same transmission acknowledge any user data (RLC acknowledgements). Multiplexing of RRC signalling and User Plane acknowledgements will be handled by the MAC layer. If the UE 101 loses the contention then a new attempt is needed.

In case the network decides to resume the UE 101, the message will be similar to a RRC resume and may include additional RRC parameters.

In case the network decides to immediately suspend the UE 101, the message will be similar to a RRC suspend. This message can possibly be delayed to allow downlink acknowledgements to be transmitted.

In case the network sends a resume reject the UE 101 will initiate a new scheduling request (SR) as in LTE, after some potential backoff time.

This procedure will, strictly speaking, transmit the User Plane data without the UE 101 fully entering RRC_CONNECTED, which formerly would happen when the UE 101 receives the RRC Response (Message 4) indicating resume. On the other hand, it uses the RRC context to enable encryption etc. even if the network's decision is to make the UE 101 remain in RRC_INACTIVE by immediately suspending the UE 101 again.

2-Step RACH Procedure

A development to transmit data more quickly for particular applications is known as a 2-step RACH. As will be appreciated, compared with the 4-step RACH process, the 2-step RACH process can provide a facility for transmitting data more quickly. Accordingly it has been proposed to develop general MAC procedures covering both physical layer and higher layer aspects for the 2-step RACH process. In general, the benefit of the 2-step RACH procedure compared with the 4-step ACH procedure is to reduce the time it takes for connection setup/resume procedure. For example in an ideal situation the 2-step RACH will reduce the latency by halving the number of steps from 4 to 2 for initial access UEs. In addition, it was concluded that a 2-step RACH procedure has potential benefits for channel access in NR unlicensed spectrum (NR-U).

Current development of a standard for new radio '2-step RACH for NR' has the following objectives:

2-step RACH shall be able to operate regardless of whether the UE has valid timing advance or not.

2-step RACH is applicable to any cell size supported in Rel-15 NR;

2-step RACH is applied for RRC_INACTIVE, RRC_CONNECTED and RRC_IDLE state

Specify contention-based 2-step RACH procedure (RAN2)

Channel structure of message A is Preamble and PUSCH carrying payload (RAN1)

reuse the Rd-15 NR PRACH Preambles design.

Only reuse the Rel-15 NR PUSCH including Rel-15 DMRS for transmission of payload of message A)

No new cyclic prefix length and no sub-PRB guard subcarrier(s)

Note 1: The above sub-bullet is to ensure that signal structure optimizations for any specific cell size (e.g. cells with RTT larger than Rel-15 PUSCH CP duration) are not pursued.

Specify the mapping between the PRACH preamble and the time-frequency resource of PUSCH in message A+ DMRS PRACH Preamble and PUSCH in a message A is TDMed Specify the supported MCS(s) and time-frequency resource size(s) of PUSCH in message A Specify power control of PUSCH of message A Specify message A's content: to include the equivalent contents of message 3 of 4-step RACH (RAN2/RAN1) Inclusion of UCI in message A is not precluded Specify message B's content: to include the equivalent contents of message 2 and message 4 of 4-step RACH (RAN1/RAN2)

Contention resolution for 2-step RACH (RAN2)

Design of RNTI for message B of 2-step RACH (RAN2)

Specify the fall back procedure from 2-step RACH to 4-step RACH (RAN2/RAN1)

All triggers for Rel-15 NR 4-step RACH are applied for 2-step RACH except for SI Request and BFR which are up to RAN2 discussion No new triggers for 2 step RACH For unlicensed operation:

After PRACH and PUSCH design enhancements are completed for NR-U in the Rel-16 NR-U WI, identify and specify the necessary modification of 2-step RACH design for its application in NR-U (RAN1/RAN2)

Figure 6:
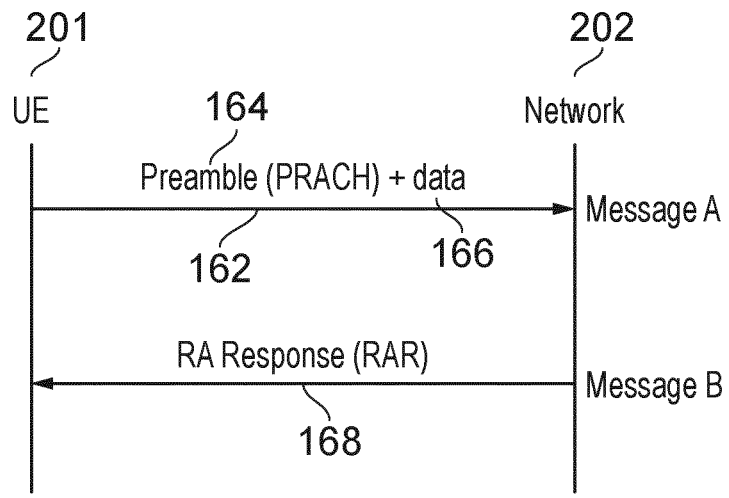
FIG. 6 is a schematic representation illustrating an example two-step random access procedure which could be applied for transmissions of small amounts of data.

A message flow diagram illustrating the 2-step RACH process is shown in FIG. 6. As its name suggests, in the 2-step RACH process, there are only two steps as follows:

1. The UE 201 transmits a Message A 162 which comprises a RACH preamble 164 and data (PUSCH) 166 that in a 4-step RACH procedure would be transmitted in Message 3. More specifically the choice of a particular preamble pre-configures the UE 201 to transmit the data in pre-configured resources of the uplink shared cannel as explained below.

2. The network 202 responds with a Message B 168 which incorporates both a RAR (message 2) of the 4-step RACH procedure and the corresponding data (PDSCH) that in a 4-step RACH procedure would be transmitted in Message 4.

Figure 7:
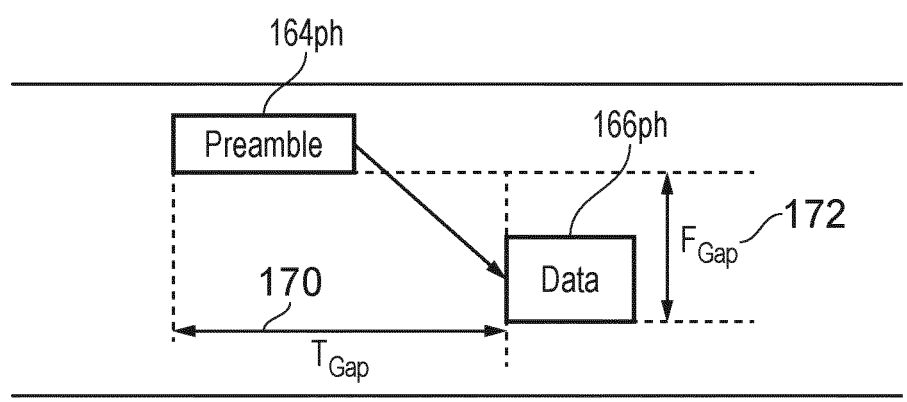
FIG. 7 is a schematic representation of physical communications resources which are used to transmit a message A of the two-step random access procedure of FIG. 6.

An envisaged schematic structure for Message A is shown in FIG. 7. As shown in FIG. 7, schematically the preamble 164 for message A is transmitted in the Physical RACH (PRACH) 164ph accompanied by a data transmission 166 in physical uplink shared channel (PUSCH) resources 166ph, in which there can be a gap between preamble transmission 164 and the PUSCH transmission in time 170 and/or frequency 172. According to the schematic illustration shown in FIGS. 6 and 7, the preamble 164 is somehow associated with the PUSCH time-frequency resources 166ph on which the data part 166 of Message A 162 will be transmitted. In some examples, this association is a one to one association in which the use of a particular preamble will be followed by a PUSCH transmission on particular time-frequency resources designated by specifying a time offset such as $T_{Gap}$ 170 in FIG. 7 and a frequency offset $F_{Gap}$ 172 from the start of the time-frequency resources used for transmitting the preamble. Such an association will be known to both the UE and the network. In other examples, this association is a many to one association in which more than one preamble is associated with one particular resource designated via its time and frequency offset. In other examples, this association is a many to many association in which more than one preamble is associated with more than one resource (i.e. in code-domain resources) designated via its time and frequency offset.

In an example, UE-ID can form part of the PUSCH in Message A at the physical layer. For example, uplink data (i.e. transport block or codeword) scrambling sequence and/or demodulation reference signal (DMRS) sequence for the PUSCH are generated by pseudo random sequences based on the UE-ID. The UE-ID can be randomly selected by the UE (e.g. Temporary C-RNTI used in 4-step RACH) or fixed in specification (e.g. RA-RNTI used in 4-step RACH). In case of the random selection, gNB may blindly detect the selected UE-ID from DMRS for PUSCH.

It will be appreciated from FIG. 7 that since a RACH is used for synchronizing the UL, if there is a significant timing advance present for this particular UE, the data transmission will suffer from inter-carrier interference and/or inter-symbol interference (from other UEs of different timing advance) if the spread of timing advances from all UEs transmitting at the same time is significantly greater than the duration of the cyclic prefix used in the transmissions. Accordingly, 2-step RACH procedure is more likely to be successful in situations in which any timing advance does not exceed the cyclic prefix duration such as in small cells. It will also be successful in any scenarios in which the UE already has knowledge of the timing advance and the known timing advance is still accurate enough such as in the case of a static UE needing resynchronization of the uplink because it has not transmitted for some time. Since its distance from the gNB has not changed since it last transmitted, the last timing advance must still be reasonably valid.

Failure of the 2-step RACH procedure can occur because the network did not detect the preamble. In this case, the UE will time out on waiting for the response and retransmit the Message A with higher power and continue in this vain until the maximum power ramping happens. Then RACH to this particular gNB will be terminated. Failure of the 2-step RACH procedure can also occur when the network having detected the preamble is unable to decode the associated PUSCH data transmission. There have been proposals that for a given UE, if the 2-step RACH procedure fails in the second mode, the UE is to fall back and engage instead in a 4-step RACH procedure. This falling back has the disadvantage that it increases the RACH procedure time since the UE restarts the 4-step process by transmitting the preamble. This long RACH time may result in dropped connections for example in failed handover, beam recovery, or delay on initial access procedure etc.

Determining failure of 2-step RACH procedure may require that the network is able to differentiate between UEs engaged in a 4-step (e.g. legacy UEs) or 2-step procedure (new UEs) since in one case, there is no PUSCH data transmission for the network to decode from the first message (message A). One way of achieving this differentiation is to partition the RACH resources between 2-step and 4-step RACH procedures. This partition can be of the preambles by dividing a set of all RACH preambles into two sub-sets, in which some of the preambles are allocated for use in 2-step RACH procedures only and the others are for use in 4-step RACH procedures only. However partitioning can also be done on the RACH time-frequency resources by using different time-frequency resources for transmitting preambles when engaged in a 2-step RACH process and different time-frequency resources for transmitting preambles when engaged in a 4-step RACH process. However, both of these approaches suffer a disadvantage because RACH resources (available preambles and time/frequency resources for their transmission) are scarce, in that there are only a limited number of preambles and allocation of more time-frequency resources for RACH also reduces efficiency.

An example embodiment of the present technique can provide a UE for transmitting data to a wireless communications network, in which the UE is configured to transmit a random access preamble, and to transmit uplink data in an uplink shared physical channel associated with the preamble according to a 2-step random access procedure, the association between the preamble and the uplink shared channel being known to the wireless communications network. The UE is configured to detect, in response to transmitting the preamble and the uplink data, a random access response message providing timing advance information and uplink grant of resources of the uplink shared channel for transmitting a request to transmit uplink data message according to a 4-step random access procedure, and in response to detecting the random access response message, to transmit a request to transmit uplink data message in the uplink resources granted in the random access response message according to a 4-step random access procedure, as if the UE was continuing with a 4-step RACH procedure even though it started with a 2-step RACH procedure.

On the network side, a radio network element such as a gNB can be configured according to an example embodiment to detect a random access preamble transmitted by a UE in a random access channel of the wireless access interface, to determine that if the random access preamble was transmitted according to a 2-step random access procedure and the 2-step random access procedure has failed, to determine a timing advance from a time of detecting the random access preamble with respect to a time of the random access channel of the wireless access interface which should be used by the UE to transmit signals to the gNB and to determine resources of the uplink shared channel granted for transmitting a request to transmit uplink data message, and to transmit a random access response message providing the timing advance information and the uplink grant of resources for transmitting the uplink data message according to a 4-step random access procedure.

Example embodiments can provide an improvement in a time required to recover from a 2-step RACH failure, by not falling-back to perform a 4-step RACH procedure, but arranging for an infrastructure equipment of the radio network which detects a preamble to transmit a random access response message (message 2) of the 4-step RACH process, so that the UE can continue as if it had started a 4-step RACH procedure by transmitting a message 3. As a result, example embodiments can:

Shorten the RACH time for falling back from 2-step to 4-step

Avoid partitioning of scarce RACH resources into those allocated for the 2-step process and those allocated to the 4-step process.

Figure 8:
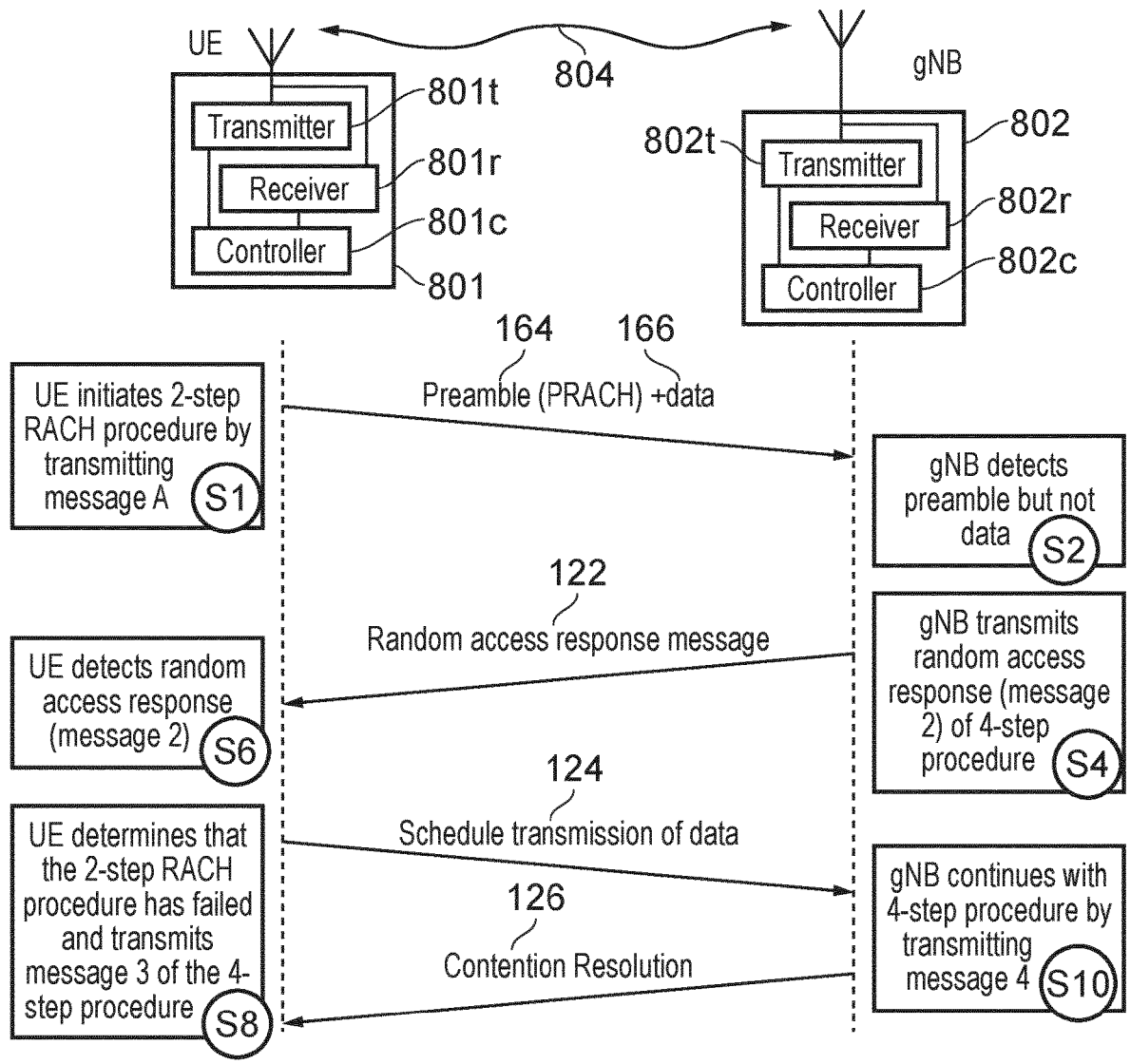
FIG. 8 is a part schematic, part message flow diagram illustrating an example embodiment of the present technique in which a communications device and a network element begins with a two-step random access procedure but falls-back to a four-step random access procedure.

An example embodiment is illustrated in FIG. 8, which provides a part schematic representation, part message flow diagram of communications between a communications device or UE 801 and an infrastructure equipment or gNodeB 802 of a wireless communications network in accordance with embodiments of the present technique. As shown in FIG. 8 the infrastructure equipment 802 provides a cell having a coverage area within which the communications device 801 is located. The communications device 801 comprises a transmitter (or transmitter circuitry) 801.*t* configured to transmit signals to the infrastructure equipment 802 via a wireless access interface 804 provided by the wireless communications network, a receiver (or receiver circuitry) 801.*r* configured to receive signals from the infrastructure equipment 802 via a wireless access interface 804, and a controller (or controller circuitry) 801.*c* configured to control the transmitter circuitry 801.*t* and the receiver circuitry 801.*r* to transmit or to receive the signals.

As can be seen in FIG. 8, the infrastructure equipment 802 also comprises a transmitter (or transmitter circuitry) 802.*t* configured to transmit signals to the communications device 801 via the wireless access interface 804, a receiver (or receiver circuitry) 802.*r* configured to receive signals from the communications device 801 via the wireless access interface 804, and a controller (or controller circuitry) 802.*c* configured to control the transmitter circuitry 802.*t* and the receiver circuitry 802.*r* to transmit or to receive the signals representing data. Each of the controllers 801.*c*, 802.*c* may be, for example, a microprocessor, a CPU, or a dedicated chipset, etc.

As represented by a first step S1, the controller circuitry 801.*c* attempts to perform a 2-step random access process by controlling the transmitter 801.*t* to transmit message A of the 2-step random access (RACH) process as explained above which comprises a RACH preamble and an associated transmission of uplink data in an uplink shared channel (PUSCH). As already explained above the association between the preamble 164 and the physical resources 166*ph* of the PUSCH is known by the infrastructure equipment (gNB) 802 of the wireless communications network. As represented by a next process step S2, the receiver circuitry 802*r* under the control of the controller circuitry 802*c* of gNB 802 detects the preamble 164 and tries to decode the data on the associated uplink shared channel resources but cannot decode the uplink data from the associated physical resources of the PUSCH 164*ph*. As will be explained shortly, this corresponds to the legacy 4-step process and so there is no difference at this point from the 4-step process. However in this case the 2-step process started by the UE 801 has failed. Therefore in a next process step S4, the controller circuitry 802*c* of the gNB 802 controls the transmitter circuitry 802*t* to transmit a random access response message 122 which is message 2 and includes timing advance information according to a 4-step random access procedure. The UE 801 at this point is assuming that it is still performing a 2-step RACH procedure and so the controller circuitry 801*c* is controlling the receiver circuitry 801*r* to detect message B. When it fails to detect message B, the receiver circuitry 801*r* is then instructed by the controller circuitry 801*c* to detect instead the random access response message 122 of message 2 of the 4-step random access procedure in step S6. Therefore in a next step S8, the controller circuitry 801*c* concludes that the 2-step random access procedure has failed. However according to embodiments of the present technique, the controller circuitry 801*c* then controls the transmitter circuitry 801*t* to transmit a scheduled transmission of data message 124 of the 4-step random access procedure as if continuing with a 4-step random access procedure. Likewise the gNB responds with the contention resolution message 126 or grant of uplink resources of the shared uplink physical channel (PUSCH) as it would do for a 4-step random access procedure.

As will be appreciated from FIG. 8, embodiments of the present technique can shorten a RACH time for falling back from a 2-step RACH to a 4-step RACH. This is because when message A is successfully decoded/received at a gNB, the gNB will send message B containing the UE ID (for example random ID generated by the UE or C-RNTI in some cases and included in Message A) as well as the preamble index that the UE had selected. However, when 2-step RACH procedure fails, because the preamble was detected, but PUSCH could not be decoded, the UE should be informed by the gNB sending a traditional random access response (RAR) message in the downlink, which signifies that a preamble was received. As for a normal 4-step procedure, the RAR reports the timing advance. A UE which having initiated a 2-step RACH procedure sees a legacy RAR message instead of a Message B would know that PUSCH decoding failed and so proceed to using the timing advance it has received from the RAR to transmit message 3 of the 4-step RACH procedure. This follow-through (instead of fallback) avoids the first two steps of the 4-step RACH procedure thereby minimizing the time duration difference between 2-step following through to 4-step and normal 4-step RACH procedure.

According to example embodiments therefore, there are two ways in which the receiver circuitry 802r in the gNB 802 can detect that an attempt at a 2-step RACH by a UE has failed, which are:

A gNB can determine that 2-step RACH has failed if, knowing that the UE initiated a 2-step RACH procedure, calculates a timing advance in the detection of the preamble that is significantly larger than the cyclic prefix duration.

A gNB can determine that 2-step RACH has failed if, knowing that the UE initiated a 2-step RACH procedure, it tries and is unsuccessful in decoding a PUSCH at the associated time-frequency resources.

As will be appreciated, the same resource allocation for RAR messages will be used to allocate resources for message B when 2-step RACH does not fail.

Embodiments of the present technique can therefore provide an advantage in that it can avoid a requirement to partition either the set of available preambles or the time-frequency RACH resources. As a result the set of preambles and the RACH resources can be used in common for both 2-step and 4-step RACH procedures. Example operation of a UE 801 and a gNB 802 according to example embodiments is illustrated by the flow diagrams of FIGS. 9 and 10, which are summarised in the following paragraphs:

Embodiment: 2-Step RACH Enabled gNB Behaviour

Figure 9:
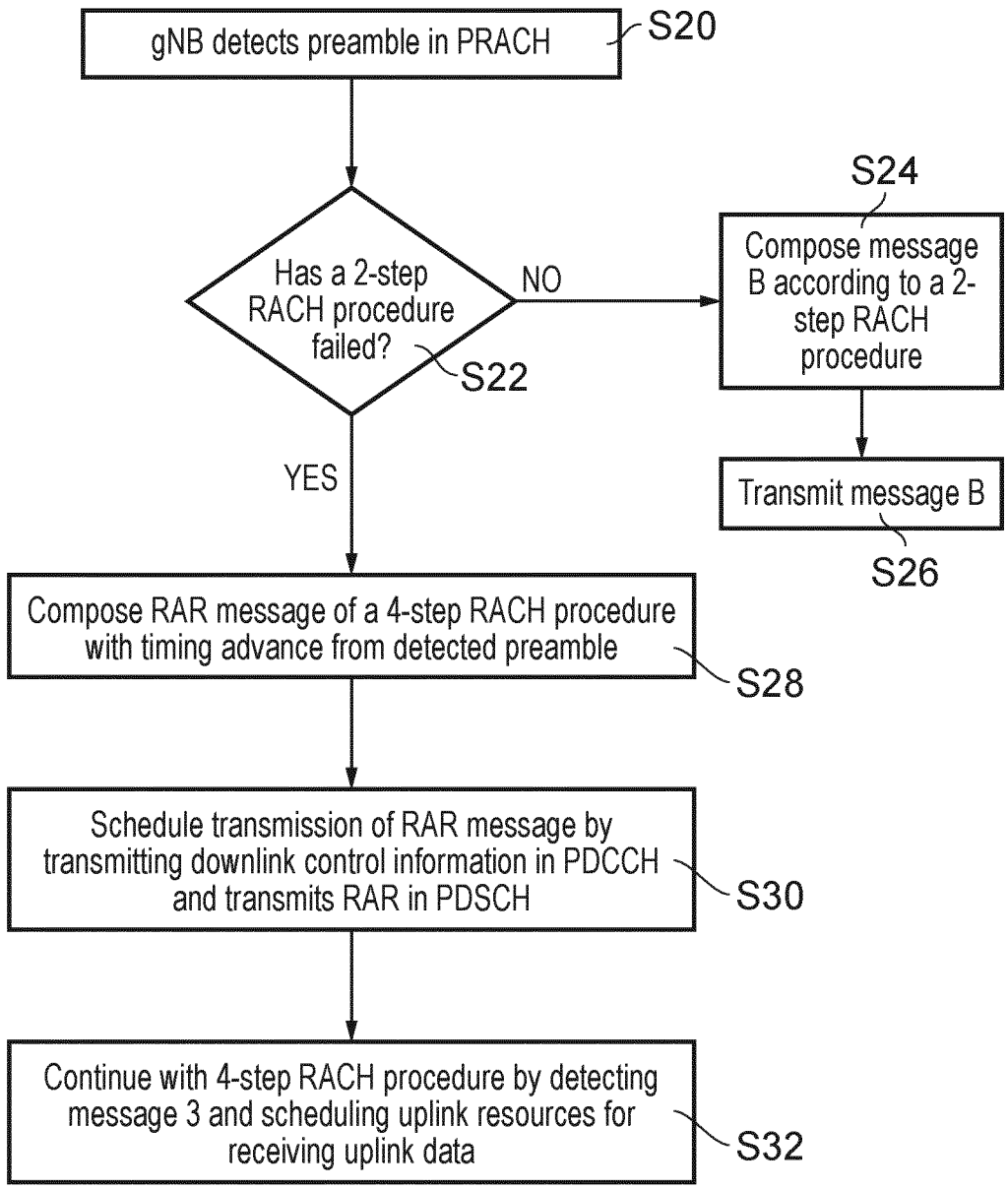
FIG. 9 is a flow diagram illustrating an example operation of a network element/infrastructure equipment according to an example embodiment.

As shown in FIG. 9, as a first step S20 a gNB configured to co-operate with UEs to perform a 2-step RACH procedure first detects a RACH preamble transmitted by a UE. As shown in FIG. 9, after first detecting a RACH preamble at the step S20, the gNB proceeds at step S22 to determine whether an attempt by a UE to perform a 2-step RACH process has failed. As indicated above, there are different techniques for the gNB to detect that the 2-step RACH process has failed. In one example, the gNB compares a time delay between a start of the physical random access channel (PRACH) and a time when a beginning of the preamble is detected with a cyclic prefix of the preamble. If the time delay is substantially greater than the cyclic prefix then the gNB concludes that the UE will not be able to gain successful access with the 2-step RACH procedure. As another example, after detecting the RACH preamble in step S20, the gNB proceeds to attempt to detect uplink data transmitted in the uplink shared channel (PUSCH) from the uplink time-frequency resources associated with the detected preamble. If the gNB succeeds in decoding the PUSCH, then it determines at step S22 that this was a 2-step RACH Message A. The gNB can then proceed at step S24 to compose a Message B, schedule it via PDCCH for transmission and at step S26 transmit the message B to the UE via PDSCH.

If at decision point S22, the gNB determines that the 2-step RACH procedure has failed for example because it is unable to decode the PUSCH, then at step S28, the gNB composes a conventional legacy RAR message of a 4-step RACH procedure (message 2), which carries the timing advance information calculated when detecting the preamble. At step S30, the gNB then schedules the RAR message via the PDCCH for transmission and transmits it to the UE via PDSCH.

If a legacy UE initiated a 4-step RACH procedure, an attempt to detect uplink data in the associated PUSCH would fail anyway as there was no PUSCH transmission or the gNB can simply detect that there is no transmission on the PUSCH resources as there would not be an associated PUSCH and the UE would receive the RAR message as expected. This requires that each RACH preamble is associated with PUSCH resources. Thereafter processing proceeds at step S32 with the 4-step RACH procedure by detecting message 3 transmitted by the UE in response to the RAR message, and by scheduling uplink resources for receiving uplink data.

Embodiment: 2-Step RACH Enabled UE Behaviour

Figure 10:
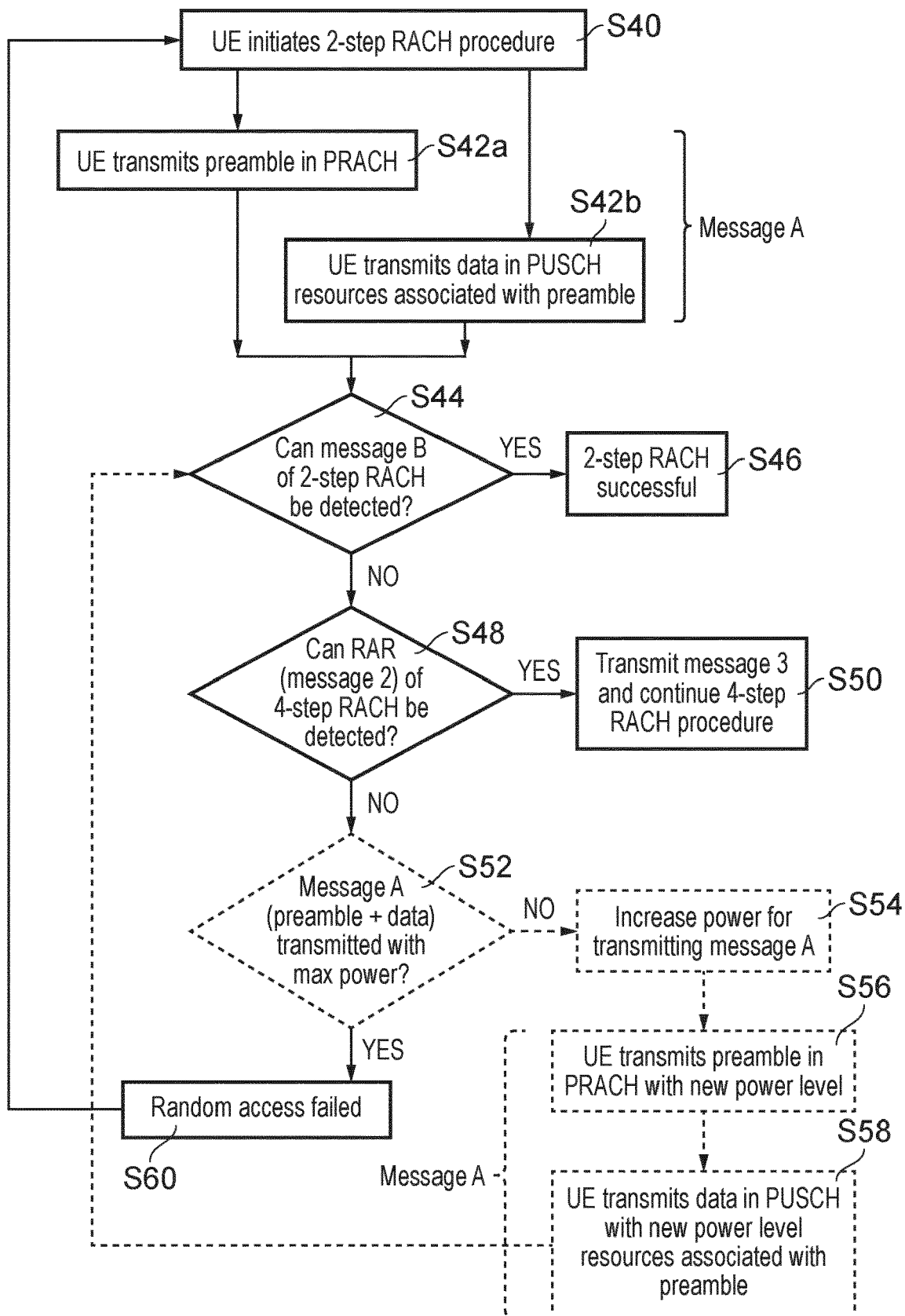
FIG. 10 is a flow diagram illustrating an example operation of a communications device according to an example embodiment.

As shown in FIG. 10, a corresponding operation of a UE begins with a 2-step RACH capable UE initiating a 2-step RACH procedure represented as step S40. According to the 2-step procedure the UE transmits Message A by transmitting a preamble in step S42a and uplink data in PUSCH resources associated with the preamble in step S42b. The UE then executes trial detection/decoding of both a RAR message (message 2) of a 4-step RACH procedure and a Message B on the RACH response downlink time-frequency resources allocated by the PDCCH according to the 2-step RACH procedure. In step S44 the UE determines whether it can detect the message B of the 2-step procedure. If it can, then processing proceeds to step S46 for a successful 2-step RACH procedure. The decoding of either a RAR message (message 2) of a 4-step RACH procedure or a Message B on the 2-step RACH is based on checking a RA-RNTI for the RAR and a different RNTI for the Message B on the PDCCH or different DCI sizes, or 1-bit in the DCI.

If the UE determines that it cannot detect the message B, then at decision point S48 the UE determines whether it can detect the RAR message of the 4-step procedure. If it cannot then the random access procedure has failed and processing proceeds to step S60, in which the UE may perform other related procedures for example or processing proceeds back to step S40. However if the UE can detect the RAR message, then the UE proceeds at step S50 to transmit message 3 of the 4-step procedure and thereafter continues with the 4-step RACH procedure without beginning again with a preamble transmission of the 4-step RACH procedure.

In some embodiments, the UE performs steps S52 to S58 in which it attempts to retry the 2-step RACH procedure. At decision point S52, the UE determines whether the preamble and uplink data transmitted in steps S42a, S42b was transmitted already with the maximum power. If it was then processing proceeds as above with step S60 where the random access has failed. If the preamble and the uplink data (message A) were not transmitted with the maximum power available to the transmitter of the UE, then the UE increases power by a determined increment at step S54 and then transmits the message A as the preamble in step S56 and the uplink data in the associated PUSCH resources in step S58. Processing then loops back to step S44 in which the UE again determines whether it can detect message B of the 2-step RACH procedure. This loop may be repeated one or more times until the maximum transmitter power is reached.

As an alternative in steps S52 to S58, the UE may simply repeat its message A transmission a number of times until an upper limited number is reached with step S52 being adapted to simply check a number of times that the message A has been transmitted and when the maximum has been reached the UE concludes that the 2-step RACH procedure has failed and proceeds at step S50 with transmitting the message 3 of the 4-step RACH procedure.

As a further alternative, the operation illustrated in FIG. 10 can be adapted so that the UE increases the power with which the message A is transmitted (preamble and uplink data) even after the RAR has been detected until the maximum power is reached. That is to say the UE retries the 2-step RACH even if the UE detects the RAR message 3 until the maximum power is reached. If the maximum power is reached then after detecting the RAR then UE proceeds with the 4-step RACH.

Those skilled in the art would appreciate that the method shown by FIGS. 9 and 10 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A communications device for transmitting data to a wireless communications network, the communications device comprising
 transmitter circuitry configured to transmit signals via a wireless access interface provided by the wireless communications network,
 receiver circuitry configured to receive signals via the wireless access interface, and
 controller circuitry configured in combination with the receiver circuitry and the transmitter circuitry
 to transmit a random access preamble,
 to transmit first uplink data in an uplink shared physical channel associated with the preamble according to a 2-step random access procedure, the association between the preamble and the transmission of the uplink data in the uplink shared channel being known to the wireless communications network,
 to detect, in response to transmitting the preamble and the uplink data, a random access response message providing timing advance information and uplink grant of resources of the shared channel according to a 4-step random access procedure,
 to determine that the 2-step random access procedure has failed, and
 to transmit, in response to the random access response message, second uplink data in the uplink resources granted in the random access response message according to a 4-step random access procedure.

Paragraph 2. A communications device of paragraph 1, wherein the second uplink data includes the first uplink data Paragraph 3. A communications device of paragraph 2, wherein second uplink data includes the first uplink data and a scheduling request to transmit uplink data.

Paragraph 4. A communications device of paragraph 1, wherein the second uplink data comprises a scheduling request to transmit uplink data.

Paragraph 5. A communications device of paragraph 1, wherein the first uplink data and the second uplink data include a scheduling request to transmit uplink data.

Paragraph 6. A communications device of paragraph 1, wherein the second uplink data includes a subset of first uplink data.

Paragraph 7. A communications device of any of paragraphs 1 to 6, wherein the control circuitry is configured to control the receiver circuitry to detect the random access response message of the 4-step random access procedure after determining that the 2-step random access process has failed.

Paragraph 8. A communications device of any of paragraphs 1 to 7, wherein the preamble and the uplink data transmitted by the transmitter circuitry form a Message A of a 2-step random access procedure, and the controller circuitry is configured to control the receiver circuitry to attempt to detect a message B of the 2-step random access procedure by detecting a particular radio network temporary identifier, RNTI, associated with Message B, and if the message B of the 2-step random access procedure is determined not to have been detected, to attempt to detect the random access response message including detecting the timing advance information and the uplink grant according to a 4-step random access procedure.

Paragraph 9. A communications device of paragraph 8, wherein the RNTI detected is based on the uplink resources in which the preamble of the Message A was transmitted and an identifier of the communications device.

Paragraph 10. A communications device of paragraph 9, wherein the identifier is a bit mask which is used to scramble the RNTI.

Paragraph 11. A communications device of any of paragraphs 1 to 10, wherein the second uplink data is message 3 of the 4-step random access procedure.

Paragraph 12. A communications device of any paragraphs 1 to 7, wherein the preamble and the uplink data transmitted by the transmitter circuitry form a Message A of the 2-step random access procedure, and the controller circuitry is configured to control the receiver circuitry
 to attempt to detect the random access response message of the 4-step random access procedure and to attempt to detect a Message B of the 2-step random access procedure in response to transmitting the Message A based on checking different RNTIs or different downlink control information sizes or data fields in a downlink control information DCI.

Paragraph 13. A communications device of paragraph 12, wherein the controller circuitry is configured to control the receiver circuitry to detect a downlink transport block transmitted in a downlink shared channel after the transmitter circuitry has transmitted message A of the 2-step random access procedure, to parse the transport block in a medium access control layer, and to determine whether the transport block comprises the random access response message of the 4-step random access procedure or the Message B of the 2-step random access procedure.

Paragraph 14. A communication device of any of paragraphs 1 to 13, wherein controller circuitry is configured to determine whether the receiver circuitry has detected the random access response message and if the receiver circuitry cannot detect the random access response message
 to determine whether the preamble and the first uplink data were transmitted at a maximum power available to the communications device, and if the preamble and the first uplink data were transmitted with less than the maximum power then the controller circuitry controls the transmitter circuitry to increase a power level of the transmitter circuitry by an incremental amount, and to re-transmit the preamble and the first uplink data with the increased power, or else if the preamble and the uplink data were transmitted with the maximum power determine that the random access procedure has failed.

Paragraph 15. A communications device of paragraph 14, wherein the controller circuitry is configured to control the transmitter circuitry to repeat transmission of the preamble and the first uplink data one or more times, with each transmission of the preamble and the uplink data being made in response to the receiver circuitry not being able to detect the random access response message and each transmission having an incremental increase in the transmission power until the maximum power is reached.

Paragraph 16. A communications device of any of paragraphs 1 to 15, wherein the controller circuitry is configured to control the transmitter circuitry to repeat the transmission of the preamble and the first uplink data, after the receiver circuitry fails to detect the random access response message (message 2) until a number of the repeated transmissions of the preamble and first uplink data has reached a maximum number, the controller circuitry determining that the random access has failed if the maximum number of repeated transmissions of the preamble and the first uplink data has been reached.

Paragraph 17. A communication device of any of paragraphs 1 to 13, wherein controller circuitry is configured in response to detecting the random access response message
  to determine whether the preamble and the first uplink data were transmitted with a maximum power available to the communications device, and if the preamble and the first uplink data were transmitted with the maximum power then the controller circuitry controls the transmitter circuitry to transmit in response to the random access response message, the request message to transmit the second uplink data according to a 4-step random access procedure, else
  if the preamble and the first uplink data were transmitted with less than the maximum power then the controller circuitry controls the transmitter circuitry to increase a power level of the transmitter circuitry by an incremental amount and to re-transmit the preamble and the first uplink data with the increased power.

Paragraph 18 A communications device according to paragraph 17, wherein at least one of the re-transmitted preamble and the first uplink data are transmitted with the timing advance value decoded in the random access response.

Paragraph 19. A communications device according to paragraph 17, wherein a transmitted power levels are either a power level of the preamble or a power level of the first uplink data.

Paragraph 20. A communications device of paragraph 17, 18 or 19, wherein the controller circuitry is configured to control the transmitter circuitry to repeat one or more times transmitting the preamble and the first uplink data with a power increased according to the incremental amount if the random access response message is detected until the maximum power level is reached.

Paragraph 21. A communications device of any of paragraphs 1 to 13, wherein the controller circuitry is configured in response to detecting the random access response message to control the transmitter circuitry to repeat one or more times transmitting the preamble and the first uplink data if after each transmission the random access response message is detected until a maximum number of repeated transmissions of the preamble and the first uplink data is reached without detecting a response message according to a successful 2-step random access procedure.

Paragraph 22. An infrastructure equipment forming part of a wireless communications network for transmitting data to or receiving data from communications devices, the infrastructure equipment comprising
  transmitter circuitry configured to transmit signals to the communications devices via a wireless access interface provided by the wireless communications network,
  receiver circuitry configured to receive signals from the communications devices via the wireless access interface, and
  controller circuitry configured in combination with the receiver circuitry and the transmitter circuitry
  to detect a random access preamble transmitted by one of the communications devices in a random access channel of the wireless access interface,
  to determine that if the random access preamble was transmitted according to a 2-step random access procedure, that the 2-step random access procedure has failed,
  to determine a timing advance which should be used by the communications device to transmit signals to the infrastructure equipment from a time of detecting the random access preamble with respect
  to a time of the random access channel of the wireless access interface and to determine resources of the shared channel granted to the communications device, and
  to transmit a random access response message providing timing advance information and according to a 4-step random access procedure.

Paragraph 23. An infrastructure equipment of paragraph 22, wherein the control circuitry is configured to determine that if the random access preamble was transmitted according to a 2-step random access procedure, that the 2-step random access procedure has failed, by
  attempting to detect uplink data in an uplink shared physical channel associated with the random access preamble according to a 2-step random access procedure, the association between the preamble and the transmission of the uplink data in the uplink shared channel being known to the infrastructure equipment, and
  if the uplink data can be detected in the uplink shared physical channel associated with the detected preamble, determining that the 2-step random access procedure has been successful and had not failed.

Paragraph 24. An infrastructure equipment of paragraph 22 or 23, wherein the control circuitry is configured to determine that if the random access preamble was transmitted according to a 2-step random access procedure, that the 2-step random access procedure has failed, if a time between detecting the random access preamble and a time of the random access channel of the wireless access interface is greater than a predetermined maximum with respect to which uplink data can be communicated using the 2-step random access procedure.

Paragraph 25. An infrastructure equipment of paragraph 22, 23 or 24, wherein the predetermined maximum with respect to which uplink data can be communicated using the 2-step random access procedure is a proportion of the temporal length of a cyclic prefix of the preamble, the control circuitry being configured to compare the time between detecting the random access preamble and the time of the random access channel of the wireless access interface with the temporal length of the cyclic prefix of the preamble and if greater, determining that the 2-step random access procedure has failed.

Paragraph 26. A method of operating a communications device for transmitting data to a wireless communications network, the method comprising
- transmitting a random access preamble,
- transmitting first uplink data in an uplink shared physical channel associated with the preamble according to a 2-step random access procedure, the association between the preamble and the transmission of the first uplink data in the uplink shared channel being known to the wireless communications network,
- detecting, in response to transmitting the preamble and the first uplink data, a random access response message providing timing advance information and uplink grant of resources of the shared channel according to a 4-step random access procedure,
- determining that the 2-step random access procedure has failed, and
- transmitting, in response to the random access response message, second uplink data in the uplink resources granted in the random access response message according to a 4-step random access procedure.

Paragraph 27. A method of paragraph 26, comprising
- determining whether the random access response message has been detected and if the random access response message cannot be detected,
- determining whether the preamble and the uplink data were transmitted at a maximum power available to the communications device, and if the preamble and the uplink data were transmitted with less than the maximum power then
- increasing a power level of the transmitter circuitry by an incremental amount, and re-transmitting the preamble and the uplink data with the increased power, or else if the preamble and the uplink data were transmitted with the maximum power
- determining that the random access procedure has failed.

Paragraph 28. A method of operating an infrastructure equipment forming part of a wireless communications network for transmitting data to or receiving data from communications devices, the method comprising
- detecting a random access preamble transmitted by one of the communications devices in a random access channel of the wireless access interface,
- determining that if the random access preamble was transmitted according to a 2-step random access procedure, that the 2-step random access procedure has failed,
- determining a timing advance which should be used by the communications device to transmit signals to the infrastructure equipment from a time of detecting the random access preamble with respect to a time of the random access channel of the wireless access interface and to determine resources of the shared channel granted to the communications device, and
- transmitting a random access response message providing timing advance information and uplink data according to a 4-step random access procedure.

Paragraph 29. Circuitry for a communications device the circuitry comprising
- transmitter circuitry configured to transmit signals via a wireless access interface provided by the wireless communications network,
- receiver circuitry configured to receive signals via the wireless access interface, and
- controller circuitry configured in combination with the receiver circuitry and the transmitter circuitry
- to transmit a random access preamble,
- to transmit uplink data in an uplink shared physical channel associated with the preamble according to a 2-step random access procedure, the association between the preamble and the transmission of the uplink data in the uplink shared channel being known to the wireless communications network,
- to detect, in response to transmitting the preamble and the uplink data, a random access response message providing timing advance information and uplink grant of resources of the shared channel according to a 4-step random access procedure,
- to determine that the 2-step random access procedure has failed, and
- to transmit, in response to the random access response message, uplink data in the uplink resources granted in the random access response message according to a 4-step random access procedure.

Paragraph 30. Circuitry for a wireless communications network comprising
- transmitter circuitry configured to transmit signals to the communications devices via a wireless access interface provided by the wireless communications network,
- receiver circuitry configured to receive signals from the communications devices via the wireless access interface, and
- controller circuitry configured in combination with the receiver circuitry and the transmitter circuitry
- to detect a random access preamble transmitted by one of the communications devices in a random access channel of the wireless access interface,
- to determine that if the random access preamble was transmitted according to a 2-step random access procedure, that the 2-step random access procedure has failed,
- to determine a timing advance which should be used by the communications device to transmit signals to the infrastructure equipment from a time of detecting the random access preamble with respect to a time of the random access channel of the wireless access interface and to determine resources of the shared channel granted to the communications device, and
- to transmit a random access response message providing timing advance information and uplink data according to a 4-step random access procedure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] Holma H. and Toskala A, "LTE for UMTS OFDMA and SC-FDMA based radio access", John Wiley and Sons, 2009.
[6] RP-172834, "Revised WID on New Radio Access Technology," NTT DOCOMO, RAN #78.
[7] ETSI TS 136 213 V13.0.0 (2016 January)/3GPP TS 36.212 version 13.0.0 Release 13.
[8] R2-168544, "UL data transmission in RRC_INACTIVE," Huawei, HiSilicon, RAN #96.
[9] R2-168713, "Baseline solution for small data transmission in RRC_INACTIVE," Ericsson, Ran #96.
[11] RP-182894, "WID: 2-step RACH for NR," RAN #82.
[12] RP-182090, "Revised SID: Study on NR Industrial Internet of Things (IoT)," RAN #81.
[13] RP-182878, "NR-based Access to Unlicensed Spectrum", RAN #82.
[14] TS 38.300 V15.4.0

What is claimed is:

1. A communications device for transmitting data to a wireless communications network, the communications device comprising:
 transmitter circuitry configured to transmit signals via a wireless access interface provided by the wireless communications network,
 receiver circuitry configured to receive signals via the wireless access interface, and
 controller circuitry configured in combination with the receiver circuitry and the transmitter circuitry:
  to transmit a random access preamble,
  to transmit first uplink data in an uplink shared physical channel associated with the preamble according to a 2-step random access procedure, the association between the preamble and the transmission of the uplink data in the uplink shared channel being known to the wireless communications network,
  to detect, in response to transmitting the preamble and the uplink data, a random access response message providing timing advance information and uplink grant of resources of the shared channel according to a 4-step random access procedure,
  to determine that the 2-step random access procedure has failed upon failure to detect the random access response message as being a second message in the 2-step random access procedure,
  to identify the random access response message as the second message in the 4-step random access procedure, and
  to transmit, in response to the random access response message, second uplink data in the uplink resources granted in the random access response message according to a 4-step random access procedure.

2. The communications device of claim 1, wherein the second uplink data includes the first uplink data.

3. The communications device of claim 2, wherein second uplink data includes the first uplink data and a scheduling request to transmit uplink data.

4. The communications device of claim 1, wherein the second uplink data comprises a scheduling request to transmit uplink data.

5. The communications device of claim 1, wherein the first uplink data and the second uplink data include a scheduling request to transmit uplink data.

6. The communications device of claim 1, wherein the second uplink data includes a subset of first uplink data.

7. The communications device of claim 1, wherein the control circuitry is configured to control the receiver circuitry to detect the random access response message of the 4-step random access procedure after determining that the 2-step random access process has failed.

8. The communications device of claim 1, wherein the preamble and the uplink data transmitted by the transmitter circuitry form a Message A of a 2-step random access procedure, and the controller circuitry is configured to control the receiver circuitry to attempt to detect a message B of the 2-step random access procedure by detecting a particular radio network temporary identifier (RNTI) associated with Message B, and if the message B of the 2-step random access procedure is determined not to have been detected, to attempt to detect the random access response message including detecting the timing advance information and the uplink grant according to a 4-step random access procedure.

9. The communications device of claim 8, wherein the RNTI detected is based on the uplink resources in which the preamble of the Message A was transmitted and an identifier of the communications device.

10. The communications device of claim 9, wherein the identifier is a bit mask which is used to scramble the RNTI.

11. The communications device of claim 1, wherein the second uplink data is message 3 of the 4-step random access procedure.

12. The communications device of claim 1, wherein the preamble and the uplink data transmitted by the transmitter circuitry form a Message A of the 2-step random access procedure, and the controller circuitry is configured to control the receiver circuitry:
 to attempt to detect the random access response message of the 4-step random access procedure and to attempt to detect a Message B of the 2-step random access procedure in response to transmitting the Message A based on detecting either:
  a first RNTI for the Message B and a second RNTI for the random access response message, or a first downlink control information size for the Message B and a second downlink control information size for the random access response message, or a first encoding of data fields in a downlink control information DCI for the Message B and a second encoding of data fields in a downlink control information DCI for the random access response message.

13. The communications device of claim 12, wherein the controller circuitry is configured to control the receiver circuitry to detect a downlink transport block transmitted in a downlink shared channel after the transmitter circuitry has transmitted message A of the 2-step random access procedure, to parse the transport block in a medium access control layer, and to determine whether the transport block comprises the random access response message of the 4-step random access procedure or the Message B of the 2-step random access procedure.

14. The communication device of claim 1, wherein controller circuitry is configured to determine whether the receiver circuitry has detected the random access response message and if the receiver circuitry cannot detect the random access response message:

to determine whether the preamble and the first uplink data were transmitted at a maximum power available to the communications device, and if the preamble and the first uplink data were transmitted with less than the maximum power then the controller circuitry controls the transmitter circuitry to increase a power level of the transmitter circuitry by an incremental amount, and to re-transmit the preamble and the first uplink data with the increased power, or else if the preamble and the uplink data were transmitted with the maximum power determine that the random access procedure has failed.

15. The communications device of claim 14, wherein the controller circuitry is configured to control the transmitter circuitry to repeat transmission of the preamble and the first uplink data one or more times, with each transmission of the preamble and the uplink data being made in response to the receiver circuitry not being able to detect the random access response message and each transmission having an incremental increase in the transmission power until the maximum power is reached.

16. The communications device of claim 1, wherein the controller circuitry is configured to control the transmitter circuitry to repeat the transmission of the preamble and the first uplink data, after the receiver circuitry fails to detect the random access response message (message 2) until a number of the repeated transmissions of the preamble and first uplink data has reached a maximum number, the controller circuitry determining that the random access has failed if the maximum number of repeated transmissions of the preamble and the first uplink data has been reached.

17. The communication device of claim 1, wherein controller circuitry is configured in response to detecting the random access response message:

to determine whether the preamble and the first uplink data were transmitted with a maximum power available to the communications device, and if the preamble and the first uplink data were transmitted with the maximum power then the controller circuitry controls the transmitter circuitry to transmit in response to the random access response message, a request message to transmit the second uplink data according to a 4-step random access procedure, else if the preamble and the first uplink data were transmitted with less than the maximum power then the controller circuitry controls the transmitter circuitry to increase a power level of the transmitter circuitry by an incremental amount and to re-transmit the preamble and the first uplink data with the increased power.

18. A method of operating a communications device for transmitting data to a wireless communications network, the method comprising:

transmitting a random access preamble, transmitting first uplink data in an uplink shared physical channel associated with the preamble according to a 2-step random access procedure, the association between the preamble and the transmission of the first uplink data in the uplink shared channel being known to the wireless communications network, detecting, in response to transmitting the preamble and the first uplink data, a random access response message providing timing advance information and uplink grant of resources of the shared channel according to a 4-step random access procedure, determining that the 2-step random access procedure has failed upon failure to detect the random access response message as being a second message in the 2-step random access procedure, identifying the random access response message as the second message in the 4-step random access procedure, and transmitting, in response to the random access response message, second uplink data in the uplink resources granted in the random access response message according to a 4-step random access procedure.

19. The method of claim 18, comprising:

determining whether the random access response message has been detected and if the random access response message cannot be detected, determining whether the preamble and the uplink data were transmitted at a maximum power available to the communications device, and if the preamble and the uplink data were transmitted with less than the maximum power then increasing a power level of the transmitter circuitry by an incremental amount, and re-transmitting the preamble and the uplink data with the increased power, or else if the preamble and the uplink data were transmitted with the maximum power determining that the random access procedure has failed.

20. A method of operating an infrastructure equipment forming part of a wireless communications network for transmitting data to or receiving data from communications devices, the method comprising:

detecting a random access preamble transmitted by one of the communications devices in a random access channel of the wireless access interface, determining that if the random access preamble was transmitted according to a 2-step random access procedure, that the 2-step random access procedure has failed, determining a timing advance which should be used by the communications device to transmit signals to the infrastructure equipment from a time of detecting the random access preamble with respect to a time of the random access channel of the wireless access interface and to determine resources of the shared channel granted to the communications device, and transmitting a random access response message providing timing advance information and uplink data as a second message according to a 4-step random access procedure to cause the communications device to fail to detect the second message under the 2-step random access procedure and to continue under the 4-step random access procedure.

\* \* \* \* \*